Jan. 18, 1966 R. J. KAWECKI 3,230,338

SELECTIVE HEATING APPARATUS

Filed July 2, 1962 2 Sheets-Sheet 1

INVENTOR.
RICHARD J. KAWECKI
BY George J. Netter
ATTORNEY

United States Patent Office 3,230,338

Patented Jan. 18, 1966

3,230,338

SELECTIVE HEATING APPARATUS

Richard J. Kawecki, Endicott, N.Y., assignor to International Business Machines Corporation, New York, N.Y., a corporation of New York Filed July 2, 1962, Ser. No. 206,775

5 Claims. (Cl. 219—85)

The invention relates broadly to selective heating apparatus, and in particular to apparatus for providing restricted area heating to effect connections of electronic and electrical components, and component-carrying modules arranged in microminiature packages.

The present direction of developments in the area of electrical and electronic packaging is toward the use of extremely small components in a very closely spaced arrangement providing total units of high component density. Further, components are arranged to form modular structures having fixed circuit relations within the modules and where electrical connections to external circuitry are provided by spaced lands on outer surface portions. A complete modular circuit package may include a number of such modules arranged on a common interconnection surface, and it is with this latter general class of modular packaging arrangements that the present invention is contemplated as being especially useful.

Electrical connections in such modular circuits pose a difficult problem mainly because of the relatively small size of the modules and the large number of connections to be made to an individual module. For example, one such known module is approximately .300 x .300 x .020 inch and requires as many as seven electrical connections to be made along a single edge. It is clear that making these connections by the use of conventional soldering devices would not be a feasible process.

It is therefore a primary object of the invention to provide an apparatus for directing heat onto relatively small, sharply defined areas.

A further object of the invention is the provision of such an apparatus wherein a plurality of points arranged in a line are heated substantially simultaneously.

Another object of the invention is the provision of such an apparatus wherein means are provided for securing a workpiece during the heating operation.

A further object of the invention is the provision of such an apparatus in which heat is simultaneously applied to pretinned areas to effect reflow soldering.

The foregoing and other objects, features and advantages of the invention will be apparent from the following more particular description of preferred embodiments of the invention, as illustrated in the accompanying drawings.

Figures 1, 2, 3:
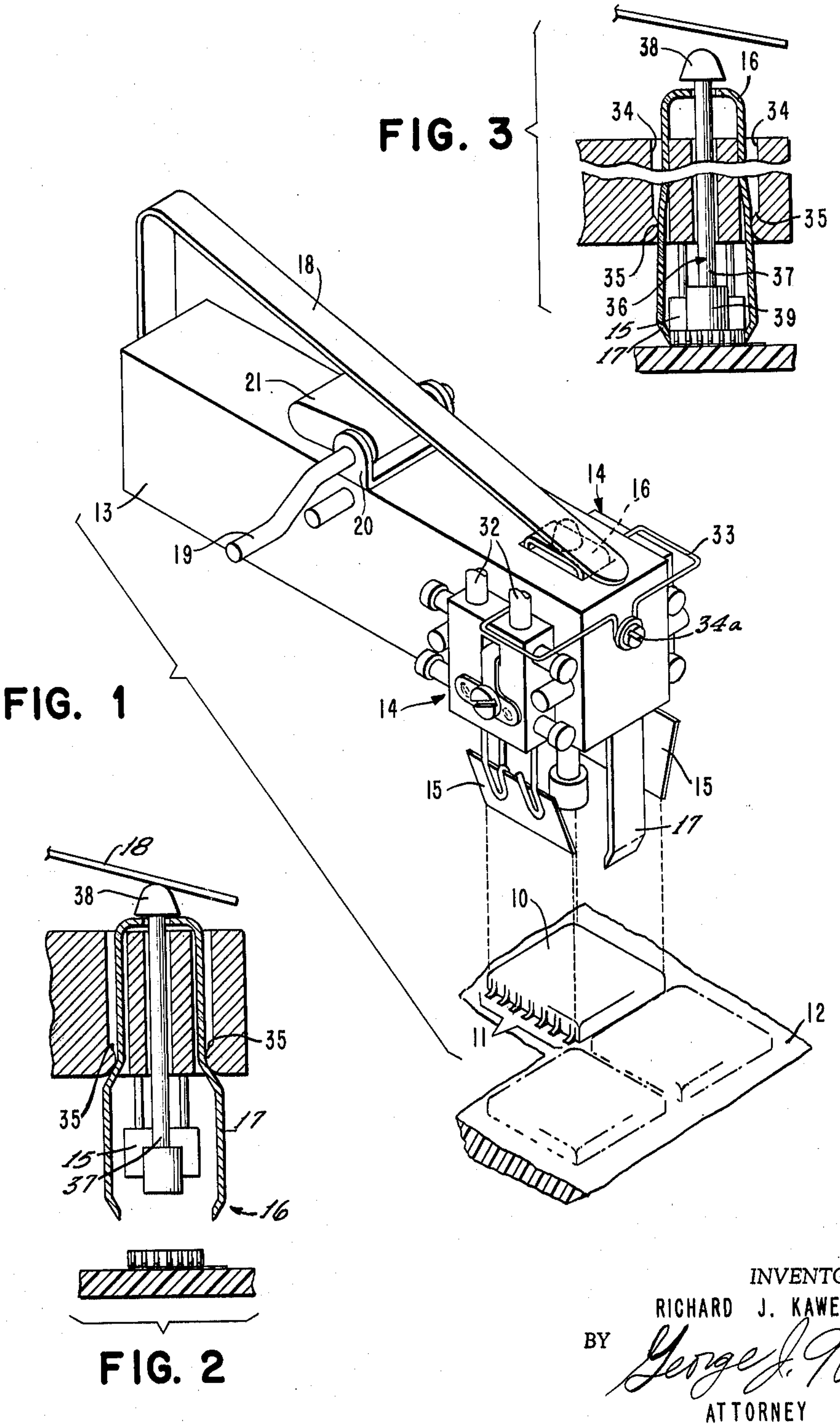
FIGURE 1 is a perspective view of one form of the invention illustrated in open, non-securing relation to the workpiece.
FIGURE 2 shows an enlarged sectional view of part of the apparatus of FIGURE 1 taken along line 2—2.
FIGURE 3 is the same sectional view as that of FIGURE 2 only taken while in engaging relation to a workpiece.

With reference now particularly to FIGURE 1 and the embodiment of the invention illustrated therein, it is important to note first of all that although the invention is considered to have applicability to other and different types of workpieces, it will be described here in relation to effecting solder reflow electrical connections on a circuit modular package 10 in which regard it has been found to be especially useful. This package comprises a generally rectangular circuit base including electronic and/or electrical components mounted thereon and having a plurality of individual connection points 11 arranged along a pair of opposite edges in a spaced lineal manner. And it is a main purpose and function of the invention to direct heat onto these edge connection points and mating lands of an interconnection board 12 in registry therewith to effect solder reflow between respective points and lands. It is also contemplated that the modules 10 are relatively small, for example in the neighborhood of .300 of an inch square and of a thickness of .020–.050 inch, and that a plurality of such modules can be interconnected to form a so-called microminiature circuit or machine.

When effecting either solder reflow or conventional soldering, it is clear that excessive amounts of heat can quickly and easily damage the modules themselves, or the components carried thereby or burn off interconnection points and associated lands causing failure of the package. Further, because of the relatively small size of the soldering areas and the multiplicity of such areas in a small space, conventional soldering apparatus would be highly ineffectual and time consuming for a feasible production process.

Still referring to FIGURE 1, the heat directing apparatus includes a rectangular elongated block-like base 13 for controlled translatory motion in a direction normal to the long dimension of the base as indicated by the dashed line, that is, toward and away from the module 10 (moving means not shown). At one end of the base there is provided at each side a heating member positioning device 14 for individually moving a pair of special heating members 15 along a path parallel to the path of movement of the block 13 for eventual disposition in working relation to the module 10.

Through an opening provided in the block 13 parallel to the direction of translation capability of the block and located between the two positioning devices 14 is disposed a retaining member 16 which terminates in a pair of springlike securing members 17 for resiliently holding a module in a way that will be set forth later.

An extended leaf spring 18 of a generally L-shape has its short leg secured to the extremity of the base 13 at which movement is provided. The longer leg extends longitudinally of the base 13 such that in a normal unobstructed position the extremity is in bearing relation to the surface of the base beyond the point at which the member 16 is received and a portion of the spring inwardly of the extremity contacts the member 16 for resiliently urging it through the opening.

A crank 19 is received within openings in the legs of a U-shaped yoke bracket 20 carried on the outer surface of the base 13 underneath the spring 18 and extending transversely thereof. Affixed to the crank 19 between the legs of the yoke 20 is an eccentric cam 21 of such dimensions that when in raised position it engages the spring 18 moving it up and away from the base 13 and out of engagement with the device 16. In its down position, the cam lies relatively flat against the upper surface of the base 13 such that it does not contact the spring 18, and therefore permits the spring to exert a driving force on the device 16 for a purpose which will be made evident below.

Figure 6:
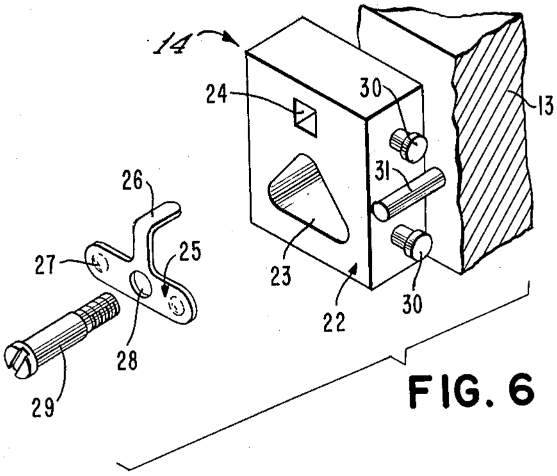
FIGURE 6 is an exploded view of one part of the blade positioning apparatus of the invention.

Referring now additionally to FIGURE 6, the heating member positioning device 14 comprises a rectangular base 22 having a generally triangular opening 23 located slightly below the center of a major surface of the block. A second opening 24 spaced from the opening 23 is so related to the same that when properly mounted onto the base 13 the opening 23 is slightly below or under the opening 24.

A special T-shaped spring slide 25 has its vertical portion bent, 26, at right angles to itself and the cross bar. Adjacent the ends of the cross bar are positioning buttons or protuberances 27 which extend in the same direction as the bent portion 26. In operative relation the slide 25 is received over the openings 23 and 24 such that the cross bar portion extends across the base of the triangle of the opening 23 with the protuberances 27 located at the corners, and the bent portion 26 being received within the opening 24. The slide 25 has an opening 28 at the junction of its vertical and cross members for receiving a threaded member 29 that is threadedly received in the base 13.

On two side surfaces of the base 22 there are provided stops 30 spaced from one another along the long dimension of the base such that guide pins 31 carried by the base 13 extending between the members 30 serve to provide limits of movement for the base 22.

Each heating member 15 has a pair of combination electrical connections and supports received upwardly into the lower surface of the block 22, but electrically isolated from the block, and secured therein. Electrical heating current is supplied from an external source (not shown) via leads 32.

A spring-like member 33 of a generally U-shape has its extremities turned toward one another and crimped slightly in the same direction normal to the general member plane. Further a notch portion is formed in the base of the member and turned at right angles to the general plane. The crimped ends are received within small openings on the upper surface of the base 22 and from which the member extends in contacting relationship with this upper surface away from the base 13 and thence back to join at the notched portion located immediately opposite the extremity of the base 13 for being secured thereto by a threaded member and washer **34*a***.

The devices 14 are resiliently held to the outer surface of the base 13 by the action of both the member 33, and the threaded members 29 through the action of the T-shaped slide 25. Accordingly, a substantially universal motion of the base 22 in a vertical plane is obtainable within the limits of the stops 30. This type of motion is further assisted by the T-shaped spring member 25 and the wiping spring action of the protuberances 27.

Turning now to FIGURES 2 and 3, the retaining member 16 is seen to comprise a generally U-shaped leaf spring, the open legs of which form the securing members 17. More particularly, the legs extend away from the base at a first parallel relationship of a dimension equal to the width of the base for a distance equal to approximately one-half its overall length. The outer parts of the members 17 flare away from one another slightly so that for the outer half of their length they are disposed at a second greater spacing relation. These members are received through a pair of suitably dimensioned openings 34 having an inner dimension substantially identical to the inner spacing of the smaller extent of the members 17. Adjacent the lower ends of the openings 34 and on the outer wall portions are wall extensions 35 extending inwardly a limited extent and thereby forming restricted passageways.

A positioning member 36 consisting primarily of a cylindrical shaft 37 is received through an opening in the base of the member 16 and a second similarly shaped opening in the base 13 intermediate the openings 34. The outer extremity of the shaft 37 terminates in a spring contact button 38 of some suitable durable material which can be merely an enlarged portion of the shaft itself.

At the opposite or inner extremity of the rod 37 is a cylindrically shaped workpiece contact body 39 of a soft pliable, but durable, material.

In FIGURE 2 the spring 18 is shown in its lowermost position contacting the button 38 and resiliently forcing the rod 37 and the member 16 downwardly to its lowest extent. This positions the relatively narrow reaches of the retaining member 16 into contact with the wall extensions 35 thereby permitting the securing members 17 to be extended to their greatest width as a result of the inherent spring action of these members.

FIGURE 3 illustrates the other of the two operating positions for the member 16, that is, where the leaf spring 18 is in the non-engaging condition with respect to the button 38 in which case the member 16 can be raised to a position where the wall extensions 35 engage the members 17. This latter action closes down the gripping throat between the members a sufficient amount so they can engage (when properly positioned initially) the edges of the module 10 and secure it during a soldering or solder reflow operation.

Figure 5:
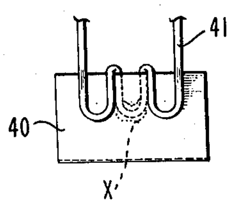
FIGURE 5 is a perspective enlarged view of the special heating member shown in FIGURE 4.
Figure 4:
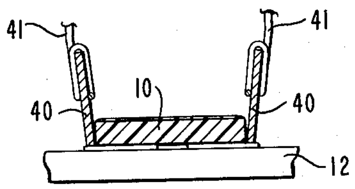
FIGURE 4 is an enlarged view of special heating members in heat application position to the workpiece.

FIGURES 4 and 5 pertain to the detailed construction of a special heat directing member 15 for use with the apparatus of FIGURE 1. The main heat directing member consists of a relatively thin rectangular body 40 which has provided optimum results when constructed of tungsten in view of the resistance of this metal to soldering as well as its self-cleaning ability when exposed to high heat. Other satisfactory materials for this purpose having the additional property of high electrical insulation and good thermal conductivity, which may be desirable in certain situations, are alumina and beryllia oxide.

The heat generating element for the body 40 consists of a length 41 of an electrical resistance material formed into a series of loops of a generally sinuous appearance. The loops are received over the edge of the rectangular body and are secured somewhat in this position by the fact that adjacent loops are on opposite sides of the member 40. The latter relation also serves to cause a more uniform and quicker heating of the body. To assure a fixed integral association, the resistance element is welded directly to the member 40 as indicated at *x*. Electric current on passing through the element 41 serves to generate heat in accordance with well-known physical principles which is transferred to the body 40. Although a number of resistance heating materials can provide adequate heating for this purpose, the best material found to date is Chromel-P, with Nichrome providing an excellent alternative although the latter does change resistance somewhat during heating which would vary the heating properties.

As to operation of the embodiment of FIGURE 1, initially the eccentric cam 21 is in the down position permitting the spring 18 to depress the button 38 and the member 16 placing the spring-like securing members 17 in their disengaging position (FIG. 2). The base 13 at this time is in a generally raised condition away from the module 10. When it is desired to initiate a heating cycle the entire assembly is moved downwardly toward the module to bring the members 17 into position immediately adjacent, but spaced from, the edges of the module 10. The crank 19 is now turned so that the cam 21 moves the spring 18 away from the button 38 and further downward movement of the block 13 causes the securing members 17 to grippingly engage the edges of the module (FIG. 3).

As shown in FIGURE 4, still further movement of the block 13 and associated apparatus brings the heating members 15 into a lowermost position with the lower edge of the body 40 contacting the board 12 immediately adjacent the edges of the module 10 and connection points 11. More exactly, the edge of the body is flush against the lands on the board and disposed at a spaced and slight angle to the connection points of the module.

While maintained in this condition electric current of a predetermined magnitude and for a prescribed duration dependent upon the particular soldering operation being performed is passed through the heating elements 41 thereby raising the temperature of the member 40 and effecting reflow of solder previously provided on the connection points 11 and mating lands on the board 12. The resilient mounting of the members 15 insures that full contact is maintained along the heating line despite any minor irregularities that may exist.

At the close of the heating cycle the crank 19 is again turned to the position shown in FIGURE 1 causing disengagement of the securing members 17 from the module 10. Now it is simply a matter of withdrawing the heating members from contacting relation and initiating the procedure anew with another module.

The above description of the operating sequence was begun with the module already in place over a corresponding group of connection lands on the interconnection board, without comment as to how this relationship was achieved. In this connection, it is considered within the ambit of the invention to utilize the securing and gripping capability of the members 17 in addition to a slight modification of the means for moving the base 13, in order to provide a further capability for obtaining modules from a remote location and bringing them to rest in registry over a particular group of connection lands. After this preparatory step, the remainder of the operation is identical with that described above.

Moreover, as described above the procedure was one of securing a module to an interconnection board. It may happen that for purposes of repair or servicing it is necessary to replace a module which has already been affixed to an interconnection board, in which case the same apparatus described can be used. Only in this case the securing members 17 are kept in engagement with the module after heat is applied so that movement of the base 13 in an upward direction will effect removal of the loosened module.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for forming a line of concentrated heat for effecting junction along the line of the contacting surfaces of one group of contacting surfaces with the contacting surfaces of at least one other group of contacting surfaces, the respective associated contacting surfaces of the different groups to be so joined comprising respective sets, at least one predetermined contacting surface of each of the respective sets being pretinned, said apparatus comprising:

a support for the surfaces;

a movable base;

means for selectively moving the base into and out of operating relation with the support;

electrical heat generating means carried by said base;

heat directing means integrally associated with the heat generating means having a thin edgelike operating face;

resilient means relating the heat generating means and heat directing means to the base such that on moving the base into operative relation with the support the operating face is brought into close proximal relationship with at least two sets of contacting surfaces to effect their simultaneous junction during heating; and securing and guilding means carried by the base having portions for effecting engagement of the surfaces to be joined and maintaining them in a fixed positional arrangement during heating.

2. Apparatus for forming a line of concentrated heat for effecting junction along the line of the contacting surfaces of one group of contacting surfaces with the contacting surfaces of at least one other group of contacting surfaces, the respective associated contacting surfaces of the different groups to be so joined comprising respective sets, at least one predetermined contacting surface of each of the respective sets being pretinned, said apparatus comprising:

a support for the surfaces;

a movable base;

means for selectively moving the base into and out of operation relation with the support;

electrical heat generating means carried by said base;

heat directing means integrally associated with the heat generating means having a thin edgelike operating face, said heat directing means consisting of a thin plate, said plate having an edge as an operating face thereof disposed angularly with respect to the surfaces of at least one group and in a substantially flush contact relationship with the respective associated contacting surfaces thereto of at least one other group during heating; and resilient means relating the heat generating means and heat directing means to the base such that on moving the base into operative relation with the support the operating face is brought into a flush contacting condition with the pretinned surfaces.

3. Apparatus as in claim 2 in which the heat directing means is constructed of tungsten.

4. Apparatus as in claim 2, in which the heat directing means is constructed of alumina.

5. Apparatus as in claim 2, in which the heat generating means comprises a length of electrical resistance heating material in sinuous contacting relation with the plate whereby on passing a heating current through the length generated heat is conducted to the plate via the areas of contact.

References Cited by the Examiner

UNITED STATES PATENTS

| | | | |
|---|---|---|---|
| 934,538 | 9/1909 | Johnson | 219—85 |
| 1,656,256 | 1/1928 | Wilson | 219—238 |
| 1,813,161 | 7/1931 | Helle | 219—553 |
| 1,816,115 | 7/1931 | Helle | 219—85 |
| 2,116,562 | 5/1938 | Cruser | 219—229 |
| 2,737,564 | 3/1956 | Barnes | 219—78 |
| 2,917,614 | 12/1959 | Caliri et al. | |
| 2,928,931 | 3/1960 | Hoopes et al. | 219—85 |
| 2,969,453 | 1/1961 | Page | 219—86 |
| 3,011,926 | 12/1961 | Rowe | 219—85 X |

FOREIGN PATENTS

| | | |
|---|---|---|
| 938,499 | 2/1956 | Germany. |

ANTHONY BARTIS, *Acting Primary Examiner.*

RICHARD M. WOOD, *Examiner.*